United States Patent
Anderson et al.

(10) Patent No.: US 9,846,970 B2
(45) Date of Patent: Dec. 19, 2017

(54) TRANSITIONING AUGMENTED REALITY OBJECTS IN PHYSICAL AND DIGITAL ENVIRONMENTS

(71) Applicant: Intel Corporation, Santa Clara, CA (US)

(72) Inventors: Glen J. Anderson, Beaverton, OR (US); Reese Bowes, Portland, OR (US); Ankur Agrawal, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/971,781

(22) Filed: Dec. 16, 2015

(65) Prior Publication Data

US 2017/0178406 A1   Jun. 22, 2017

(51) Int. Cl.
*G09G 5/00* (2006.01)
*G06T 19/00* (2011.01)
*G06F 3/01* (2006.01)

(52) U.S. Cl.
CPC .............. *G06T 19/006* (2013.01); *G06F 3/01* (2013.01); *G06T 2215/16* (2013.01)

(58) Field of Classification Search
CPC ...... G06T 19/006; H04N 21/84; A63F 13/211
See application file for complete search history.

(56) References Cited

U.S. PATENT DOCUMENTS

| | | | | |
|---|---|---|---|---|
| 5,443,260 A | * | 8/1995 | Stewart | A63B 69/0002 473/421 |
| 9,418,479 B1 | * | 8/2016 | Worley, III | G01B 11/2513 |
| 2005/0023763 A1 | * | 2/2005 | Richardson | A63B 24/0003 273/348 |
| 2008/0219509 A1 | * | 9/2008 | White | A63B 24/0003 382/107 |
| 2008/0310707 A1 | | 12/2008 | Kansal et al. | |
| 2010/0302015 A1 | | 12/2010 | Kipman et al. | |
| 2011/0273562 A1 | * | 11/2011 | Dawe | A63B 24/0021 348/139 |
| 2012/0220385 A1 | * | 8/2012 | Richardson | A63B 24/0021 473/156 |
| 2013/0278633 A1 | * | 10/2013 | Ahn | G06T 19/006 345/633 |
| 2013/0342570 A1 | * | 12/2013 | Kinnebrew | G09G 3/003 345/633 |
| 2014/0004969 A1 | | 1/2014 | Jang et al. | |
| 2015/0123965 A1 | | 5/2015 | Molyneaux et al. | |

FOREIGN PATENT DOCUMENTS

WO   WO2014-053346 A1   4/2014

OTHER PUBLICATIONS

International Search Report and Written Opinion dated Feb. 22, 2017 for International Application No. PCT/US2016/060166, 16 pages.

* cited by examiner

*Primary Examiner* — Thomas Lett
(74) *Attorney, Agent, or Firm* — Schwabe, Williamson & Wyatt, P.C.

(57) ABSTRACT

Described are apparatuses, methods and storage media associated with transitioning an augmented reality object between physical and digital environments, wherein the augmented reality object is embodied in at least two information carrying objects, which information carrying objects comprise a sensor-enabled physical object and a digital object.

24 Claims, 9 Drawing Sheets

TRANSITIONING AUGMENTED REALITY OBJECTS IN PHYSICAL AND DIGITAL ENVIRONMENTS

TECHNICAL FIELD

The present disclosure relates to the field of computing. More particularly, the present disclosure relates to augmented reality objects and transitioning augmented reality objects between physical and digital environments.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Gaming computers are known to include controllers which allow a user to control an on-screen object. For example, a wheel on a controller may be turned to steer a digital representation of a car around a digital track or a hand-held wand can be swung to "throw" or "roll" a digital bowling ball down a digital representation of a bowling lane. However, the digital representation of the car or bowling ball does not transition into a real, physical environment, nor back to the digital environment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 and includes illustration of an example of an Augmented Reality Object being transitioned between physical, digital and back to physical embodiments

DETAILED DESCRIPTION

Figure 1:
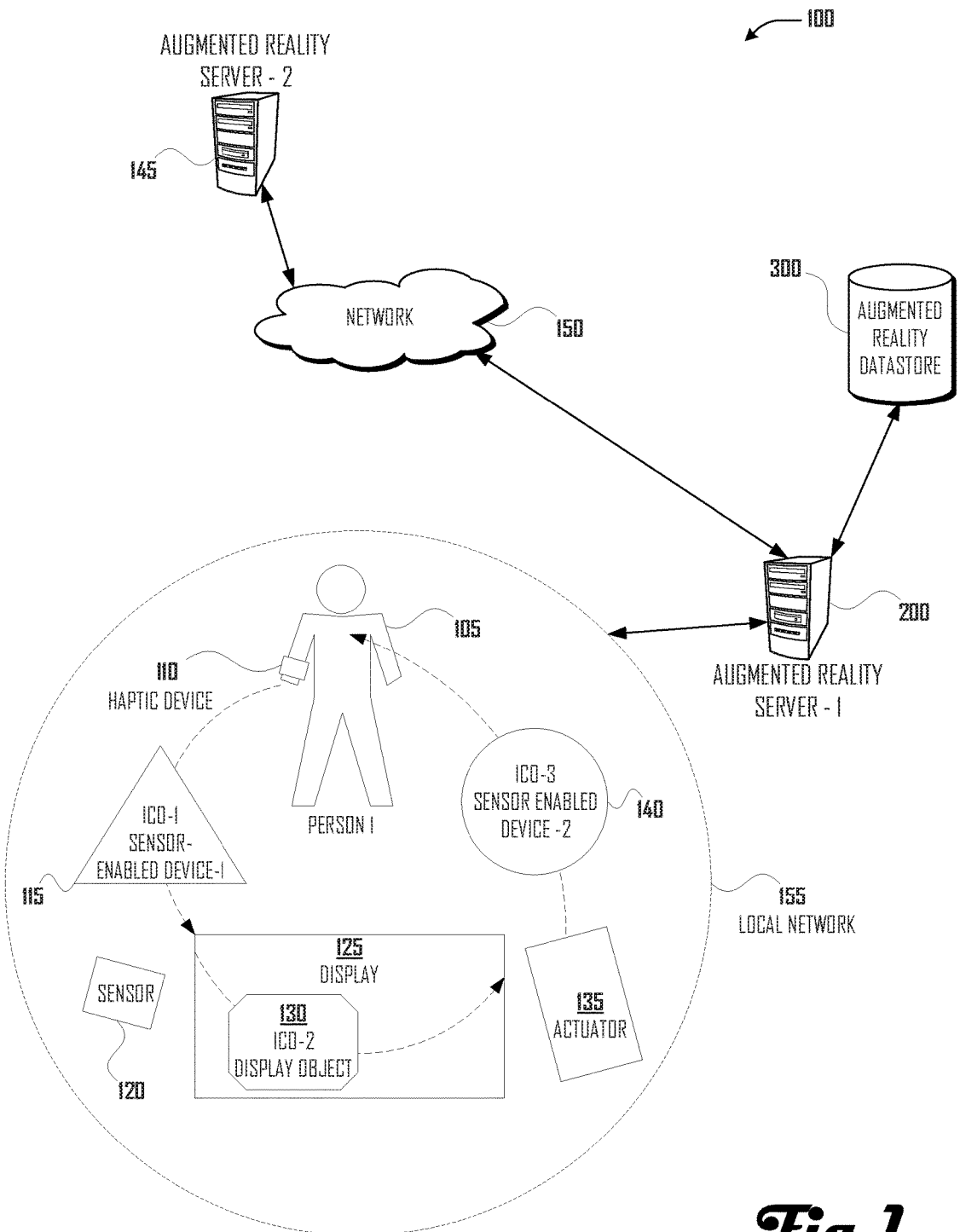
FIG. 1 is a network and device diagram illustrating examples of network(s), computing devices, and physical and logical relationship of these components, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope or spirit of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Use of a reference number without a letter suffix is a reference to a type of component, encompassing all components illustrated with the common reference number.

As used herein, the term "module" may refer to, be part of, or include an Application Specific Integrated Circuit (ASIC), a System on a Chip (SoC), an electronic circuit, a processor (shared, dedicated, or group) and/or memory (shared, dedicated, or group) that execute one or more software or firmware programs, a combinational logic circuit, and/or other suitable components that provide the described functionality.

In overview, disclosed are methods and apparatuses to transition an augmented reality object between physical and digital environments, wherein the augmented reality object may exist in either environment as an information carrying object ("ICO"), wherein a sensor monitors for a first ICO, which first ICO embodies the augmented reality object, where the sensor also monitors for a characteristic of the first ICO in the first environment, where a parameter of the characteristic is measured, where the characteristic is a transition event trigger for instantiating the augmented reality object in a second ICO in the second environment, where an actuator activates a renderable attribute in the second ICO, and where the renderable attribute approximates the characteristic of the first ICO according to the parameter.

Referring to FIG. 1, illustrated is Augment Reality Server-1 200. Augment Reality Server-1 200 is illustrated further in FIG. 2 as comprising Modality Tracking Module 400 (illustrated further in FIG. 4), Actuator Module 500 (illustrated further in FIG. 5), Sensor Detection Module 600 (illustrated further in FIG. 6), and Digital Object Rendering Module 260. These modules communicate via Local Network 155 (or via Network 150) with Sensor 120, Actuator 135, and Display 125.

Sensor 120 and Actuator 135 sense and control ICO-1 Sensor-Enabled Device-1 115, ICO-2 Display Object 130, and ICO-3 Sensor Enabled Device-2 140.

Sensor 120 may be a sensor of objects in the physical environment, such as a microphone, a pressure sensor, a motion detector, a camera, a capacitive surface, a conduction detector, a detector of electromagnetic energy (such as RF, infrared, visible light, etc.), a vibration detector, a proximity detector, a fiducial marker detector, and the like.

For example, Sensor 120 may detect a physical object, such as a bean-bag or foam dart, which is thrown at or otherwise becomes proximate to or contacts a touch- or proximity-sensitive screen, target, or display. A touch- or proximity-sensitive screen, target, or display may be incorporated into a digital rendering device, such as, for example, Display 125. In this example, detection of the object by Sensor 120 may be via one or more camera(s) which track the object, via touch- or proximity-sensitive detectors in the display, via acoustic sensor, and the like.

Sensor 120 may also be a sensor of objects in a digital environment, as may be rendered in, for example, Display 125; in this case, Sensor 120 may comprise a registration by a sensor module with a digital object rendering module and/or with an operating system. Such registration may allow Sensor 120 to receive information regarding the rendering of digital object in the digital environment.

Whether in measuring objects in the physical environment or in a digital environment, Sensor 120 may detect, for example, digital or physical characteristics of objects in the respective environments. These characteristics may comprise, for example, a time, an orientation, a position, a rate of change in position, a relative position, an encoded information, a color, and a sound. Orientation, position, and rate of change in position may be relative to Sensor 120, relative to another object (such as relative to touch-sensitive screen, relative to the edge of a screen, which may be understood as another digital object), or relative to an external frame of reference. Certain of such characteristics may be transition event triggers (discussed further herein), in which case such characteristics may be stored in Augmented Reality Datastore 300 as Characteristic 340 records.

Selection of which object(s) to sense and/or to record a characteristic in relation to may be according to whether such object(s) can be identified as an Information Carrying Object ("ICO"), such as ICO-1 Sensor Enabled Device-1 115, ICO-2 Display Object 130, and ICO-3 Sensor Enabled Device-2 140. Distinguishing ICOs from other objects may be performed, for example, by Modality Tracking Module 400 and/or Sensor Detection Module 600.

In the physical environment, an ICO may comprise a physical object comprising an emitter of at least one of information encoded in an acoustic energy, an electromagnetic radiation, an electric energy, an acceleration, and a magnetic field. For example, a physical ICO may comprise a bean-bag, ball, dart, block, construction block or the like made from a wide range of materials (plastics, metals, wood, composite materials, or otherwise) with a bar code, QR code or otherwise recognizable structure or pattern, RFID, active or passive transceiver, or the like. The physical ICO may also comprise a detector of such information and a transmitter capable of transmitting or communicating such detected information (or a result thereof) to Sensor 120. Both examples are referred to herein as "sensor-enabled device", as they are objects or devices which a Sensor, such as Sensor 120, is able to detect. Records regarding such physical ICOs may be stored in Augmented Reality Datastore 300 as Sensor-Enabled Object 315.

In a digital environment, ICOs may comprise information encoded in a digital object. Digital object ICOs may comprise rendered characteristics such as pixels, audio, vibratory or other haptic output (via a haptic emitter), a smell (via chemical emitters), and the like. Records regarding such digital ICOs may be stored in Augmented Reality Datastore 300 as Digital Object 320. Both Sensor-Enabled Object 315 and Digital Object 320 records may be sub-types of Information Carrying Object 310 records.

In the case of both physical object and digital object ICOs, the ICO may encode or be associated with an identifier, which identifier and additional information may be stored in a Sensor-Enabled Object 315, Digital Object 320, and/or Information Carrying Object 310 record.

Actuators, such as Actuator 135, may control an object, including an ICO, in a digital or the physical environment. In the case of the physical environment, Actuator may comprise at least one of a speaker, a haptic output device (such as Haptic Device 110), a motor (including servos, rotary motors, linear motors, piezoelectric sensors and actuators), a switch, a source of compressed water, air, or other gas or fluid, a projectile ejecting device (such as a gun, whether spring loaded, compressed air, or otherwise) and a controller thereof, a digital rendering module (for example, a physical object with a digital rendering module therein), and/or another way to control an acoustic energy emission, an electromagnetic radiation emission, an electric energy application, a magnetic field, and an acceleration or deceleration emitted or experienced by a physical object, including by an ICO. In the case of a digital environment, Actuator may comprise a registration with a digital object rendering module and/or with an operating system. Such registration may allow Actuator 135 to control rendering of digital object in the digital environment.

ICOs, Sensors, Actuators and Augmented Reality Servers may be paired.

In both physical and digital environments, Augmented Reality Server-1 200 may, using Sensor Detection Module 600 and Sensor 120, detect characteristics of ICOs. Certain of the characteristics may be transition event triggers, signaling that an Augmented Reality Object is to be transitioned from a first Augmented Reality Object State to a second Augmented Reality Object State. Augmented Reality Object States may be store in Augmented Reality Datastore 300 as ARO State 370 records. In the first Augmented Reality Object State, Augmented Reality Object 305 may be embodied in a first ICO; in the second Augmented Reality Object State, Augmented Reality Object 305 may be embodied in a second ICO. Transition event triggers may be stored in Augmented Reality Datastore 300 as Transition Event Trigger 345.

For example, in FIG. 1, Augmented Reality Server-1 200 may detect, via Modality Tracking Module 400, Sensor 120, and Sensor Detection Module 600, that Person-1 105 has thrown a foam dart, ball, or the like, represented by ICO-1 Sensor-Enabled Device-1 115. Approach of ICO-1 Sensor-Enabled Device-1 115 toward or within a proximity of a target, such as Display 125, may be a Characteristic 340 associated with ICO-1 Sensor-Enabled Device-1 115 that is also a Transition Event Trigger 345, signaling that an Augmented Reality Object should be transitioned from a first state, ARO State 370, in which Augmented Reality Object 305 is embodied in ICO-1 Sensor-Enabled Device-1 115, to a second ARO State 370, in which Augmented Reality Object 305 is embodied in ICO-2 Display Object 130.

Transition of Augmented Reality Object 305 from ICO-1 Sensor-Enabled Device-1 115 to ICO-2 Display Object 130 may be accomplished by Modality Tracking Module 400 determining a transition event output in relation to detected Characteristic 340. The transition event output may comprise a range of outputs, depending on what is determined to be the next ICO. Transition event output may be stored in Augmented Reality Datastore 300 as Transition Event Output 350. Transition Event Output 350 may also be associated with a subsequent state of Augmented Reality Object 305.

For the then-current state of Augmented Reality Object 305, Modality Tracking Module 400 may identify one or more ICOs which may be recipients for or may otherwise embody Augmented Reality Object 305 in its then-current state. For example, ICO-2 Display Object 130 may be identified as an ICO to embody Augmented Reality Object 305.

Modality Tracking Module 400 may determine renderable attributes in relation to the determined ICO. For example, a renderable attribute may be a shape of a digital display object, a sound, a motion, a manner of interaction with other objects, and the like. Renderable attributes may be stored as, for example, Renderable Attribute 355 records in Augmented Reality Server-1 200. Renderable Attribute 355 records may further be associated with parameter, which parameter may be stored in Augmented Reality Datastore 300 as Renderable Attribute Parameter 360. Renderable Attribute Parameter 360 may be a variable aspect of a Renderable Attribute 355, such as a speed, an angle, a color, and the like. Modality Tracking Module 400 may determine Renderable Attribute 355 and Renderable Attribute Parameter 360 based on, for example, a table, link, association or similar mapping or correspondence between the two. Renderable Attribute Parameter 360 may be a measured characteristic of an ICO; the measured characteristic may be a Characteristic 340 or Sensor Data 325, though it need not also be Transition Event Trigger 345.

Renderable Attribute 355, as determined in part by Renderable Attribute Parameter 360, may be rendered in ICO-2 Display Object 130, to approximate a Characteristic 340 of ICO-1 Sensor Enabled Device-1, such that, when rendered, ICO-2 Display Object 130 approximates Characteristic 340 of ICO-1 Sensor Enabled Device-1. In the example illustrated in FIG. 1, ICO-2 Display Object 130 may be rendered move across Display 125 at a speed and angle determined from Characteristic 340 of ICO-1 Sensor Enabled Device-1.

In the example illustrated in FIG. 1, contact by ICO-2 Display Object 130 with a window boundary or another digital object rendered in Display 125 may be detected by Sensor 120 and may be determined by Augmented Reality Server-1 200 and Modality Tracking Module 400 to be associated with a Transition Event Trigger 340 record for transitioning Augmented Reality Object 305 from Display 125 to the physical environment, via Transition Event Output 350, Actuator 135 and ICO-3 Sensor Enabled Device-2 140. As before, a Renderable Attribute 355 may be determined from a Characteristic 340 of ICO-2 Display Object 130, which Renderable Attribute 355 may approximate Characteristic 340 of ICO-2 Display Object 130. The Renderable Attribute 355 may be implemented by Actuator 135, which may, for example, shoot ICO-3 Sensor Enabled Device-2 140 with a speed and at an angle derived from or influenced by Characteristic 340 of ICO-2 Display Object 130.

In another view of the example illustrated in FIG. 1, Person-1 105 or a different person may throw ICO-1 Sensor-Enabled Device-1 115 toward Display 125. ICO-1 Sensor-Enabled Device-1 115 may be interpreted as a spider and may have, for example, the physical shape of a spider. Proximity to Display 125 by ICO-1 Sensor-Enabled Device-1 115 may be associated with Transition Event Trigger 340 record for transitioning Augmented Reality Object 305 from the "spider" ICO-1 Sensor-Enabled Device-1 115 to a graphical representation of a spider, which may be ICO-2 Display Object 130. Transition Event Output 350 and Renderable Attribute 355 may be implemented by Actuator 135 to cause a "spider" ICO-2 Display Object 130 to "crawl" across Display 125. The "crawling" speed of "spider" ICO-2 Display Object 130 across Display 125 may be derived from a Characteristic 340 record measured in relation to ICO-1 Sensor-Enabled Device-1 115. Contact by the "spider" of ICO-2 Display Object 130 with the boundary of a window in Display 125 may be sensed by Sensor 120 and may be associated with a Transition Event Trigger 345 record, for transitioning the "spider" Augmented Reality Object 305 from the "spider" of ICO-2 Display Object 130 to a haptic output. In this view of the example, Haptic Device 110 may be on an arm of Person-1 105 which is holding or is proximate to the side of Display 125 which is contacted by the "spider" of ICO-2 Display Object 130. The resulting Transition Event Output 350 and Renderable Attribute 355, as implemented by Modality Tracking Module 400, may then result in vibration of Haptic Device 110, with a frequency drawn from a Characteristic 340 of the movement of "spider" of ICO-2 Display Object 130 across Display 125.

Also illustrated in FIG. 1 is Augmented Reality Server-2 145. Augmented Reality Server-2 145 is a second example of a computing device similar to Augmented Reality Server-1 200, embodying similar modules and communicating with components and people similar to those illustrated within Local Network 155. Augmented Reality Server-1 200 and Augmented Reality Server-2 145 may work together to allow two or more people and/or components to participate in shared interactive sessions, such a wherein ICO-2 Display Object 130 is also or alternatively displayed on a digital display local to Augmented Reality Server-2 145.

Network 150 and Local Network 155 may comprise computers, network connections among the computers, and software routines to enable communication between the computers over network connections. Network 150 may be used to enable relatively long-range communication (such as, for example, between Augmented Reality Server-2 145 and Augmented Reality Server-1 200 or a component within Local Network 155), while Local Network 155 may be used to enable relatively short-range communication (such as, for example, between Augmented Reality Server-1 200 and Actuator 135). Examples comprise an Ethernet network, the Internet, and/or a wireless network, such as a GSM, TDMA, CDMA, EDGE, HSPA, LTE or other network provided by a wireless service provider. Connection to the Network 150 or Local Network 155 may be via a wired or a wireless connection, such as a Wi-Fi connection. More than one network may be involved in a communication session between the illustrated devices. Connection to the Network 150 and/or Local Network 155 may require that the computers execute software routines which enable, for example, the seven layers of the OSI model of computer networking or equivalent in a wireless phone network.

Figure 2:
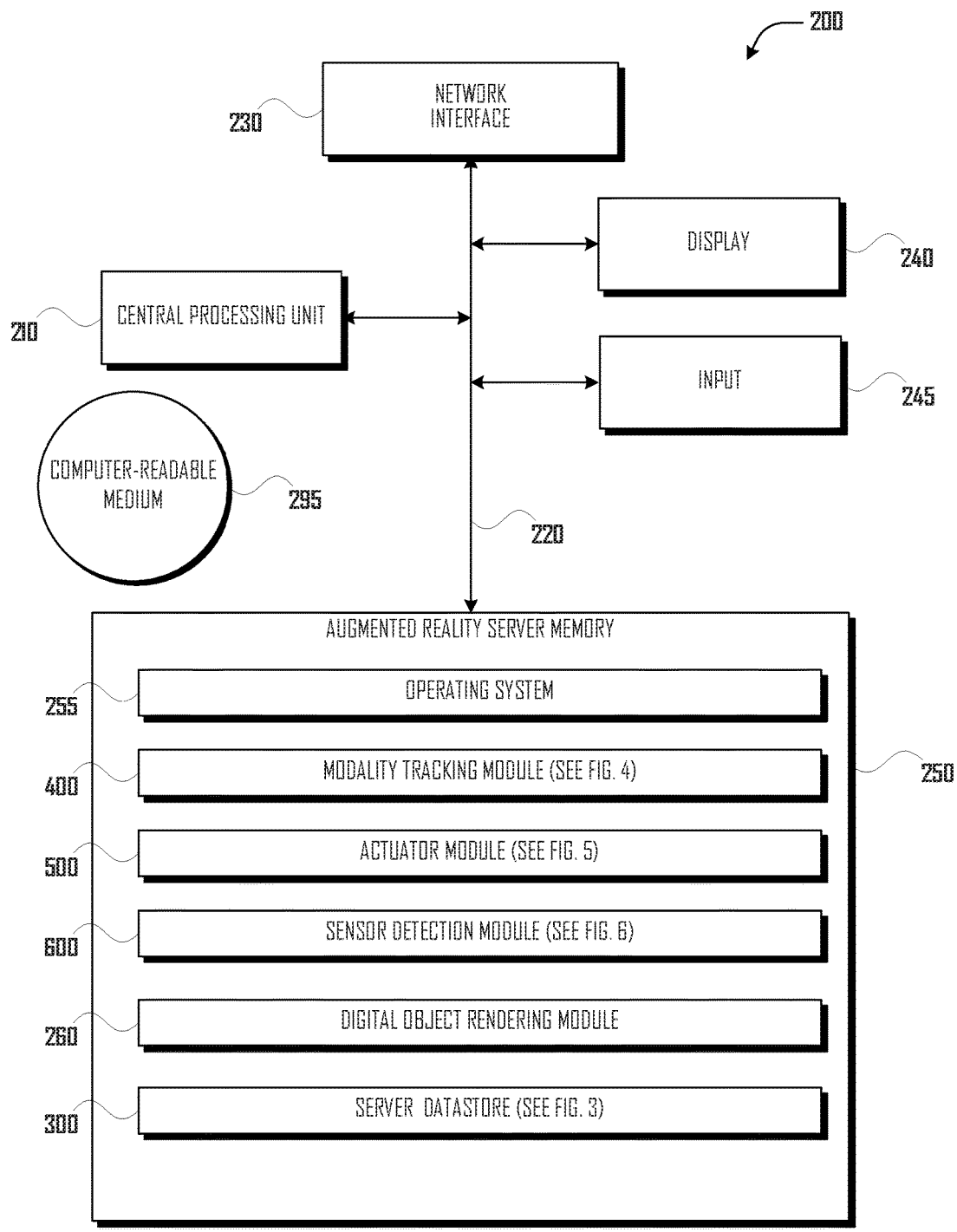
FIG. 2 is a functional block diagram illustrating an example of Augmented Reality Server.

This paper may discuss a first computer as connecting to a second computer (such as Display 125 connecting to Augmented Reality Server-1 200) or to a corresponding datastore (such as to Augmented Reality Datastore 300); it should be understood that such connections may be to, through, or via the other of the two components (for example, a statement that a computing device connects with or sends data to Augmented Reality Server-1 200 should be understood as saying that the computing device may connect with or send data to Augmented Reality Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization FIG. 2 is a functional block diagram of an exemplary Augmented Reality Server-1 200 computing device and some data structures and/or components thereof. Augmented Reality Server-1 200 in FIG. 2 may comprise at least one Processing Unit 210, Augmented Reality Server Memory 250, Display 240 and Input 245, which all may be interconnected along with Network Interface 230 via Bus 220. Processing Unit 210 may comprise one or more general-purpose Central Processing Units ("CPU") 212 as well as one or more special-purpose Graphics Processing Units ("GPU") 214. The components of Processing Unit 210 may be utilized by Operating System 255 for different functions required by the routines executed by Augmented Reality Server-1 200. Network Interface 230 may be utilized to form connections with Network 150, Local Network 155, or to form device-to-device connections with other computers. Augmented Reality Server Memory 250 may generally comprise a random access memory ("RAM"), a read only memory ("ROM"), and a permanent mass storage device, such as a disk drive, SDRAM (synchronous dynamic random-access memory), or SSD (solid state drive). Augmented Reality Server Memory 250 may store program code for software routines or modules, such as, for example, Modality Tracking Module 400, Actuator Module 500, Sensor Detection Module 600, and Digital Object Rendering Module 260, as well as, for example, browser, email client and server routines, client applications, and database applications (discussed further below). Additional data groups for routines, such as for a webserver and web browser, may also be present on and executed by the Augmented Reality Server-1 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, Augmented Reality Server Memory 250 may also store Operating System 255. These software components may be loaded from a non-transient Computer Readable Storage Medium 295 into Augmented Reality Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

Augmented Reality Server-1 200 may also comprise hardware supporting input modalities, Input 245, such as, for example, a touchscreen, a camera, a keyboard, a mouse, a trackball, a stylus, motion detectors, and a microphone. Input 245 may also serve as Display 240, as in the case of a touchscreen display which also serves as Input 245, and which may respond to input in the form of contact by a finger or stylus with the surface of Input 245. Display 240 represents any technology capable of rendering graphics, audio, smells, vibrations, and the like. An example of Display 240 is Display 125 in FIG. 1.

Figure 3:
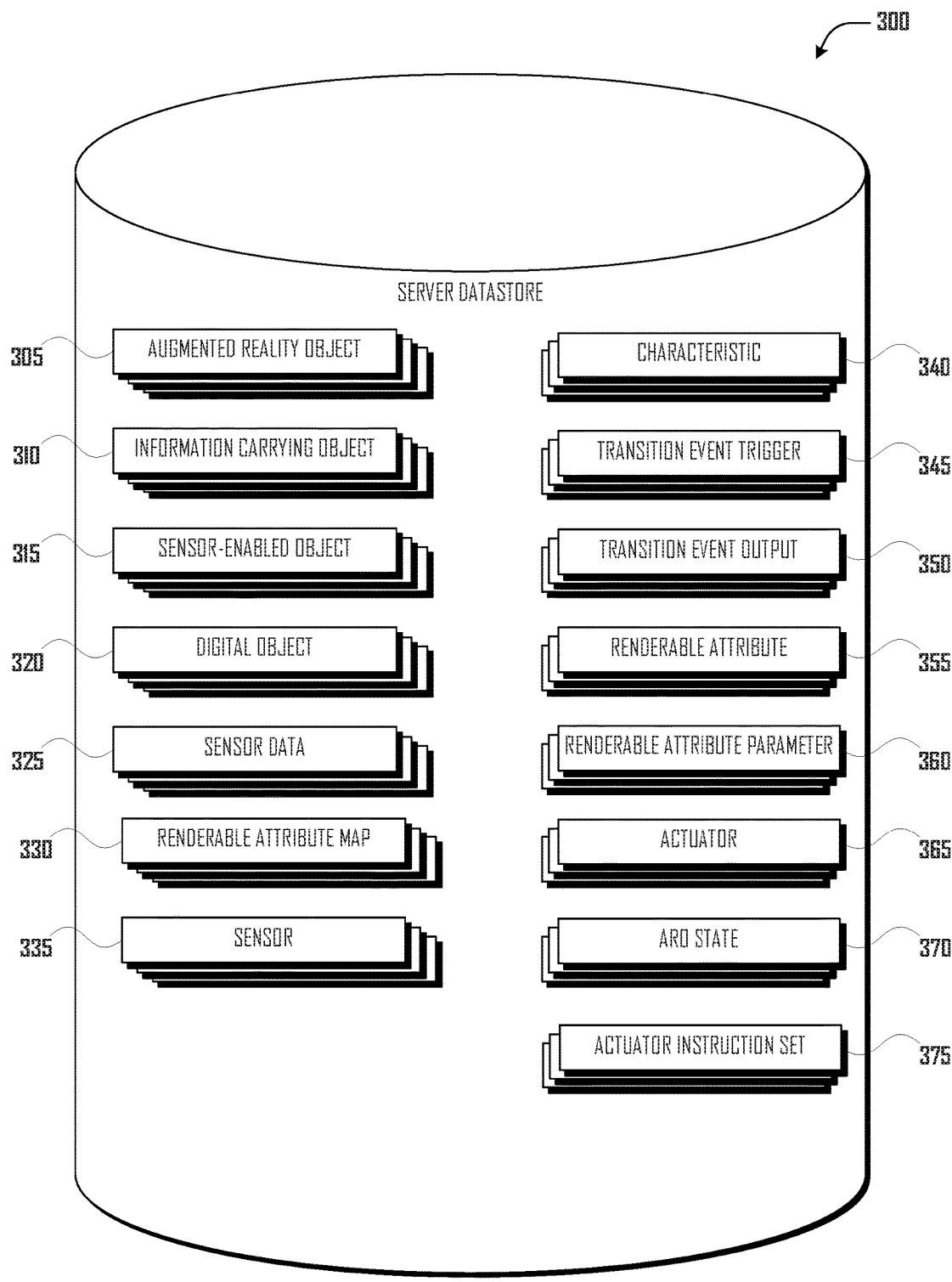
FIG. 3 is a block diagram illustrating an example of Augmented Reality Server Datastore.

Augmented Reality Server-1 200 may also comprise or communicate via Bus 220 with Augmented Reality Datastore 300, illustrated further in FIG. 3. In various embodiments, Bus 220 may comprise a storage area network ("SAN"), a high speed serial bus, and/or via other suitable communication technology. In some embodiments, Augmented Reality Server-1 200 may communicate with Augmented Reality Datastore 300 via Network Interface 230. Augmented Reality Server-1 200 may, in some embodiments, include many more components than those shown in this Figure. However, it is not necessary that all of these generally conventional components be shown in order to disclose an illustrative embodiment.

FIG. 3 is a functional block diagram of Augmented Reality Datastore 300 illustrated in the computing device of FIG. 2. The components 305-399 of Augmented Reality Datastore 300 may include data groups used by routines. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components 305-399 of Augmented Reality Datastore 300 are discussed further herein in the discussion of the remaining Figures.

Figure 4:
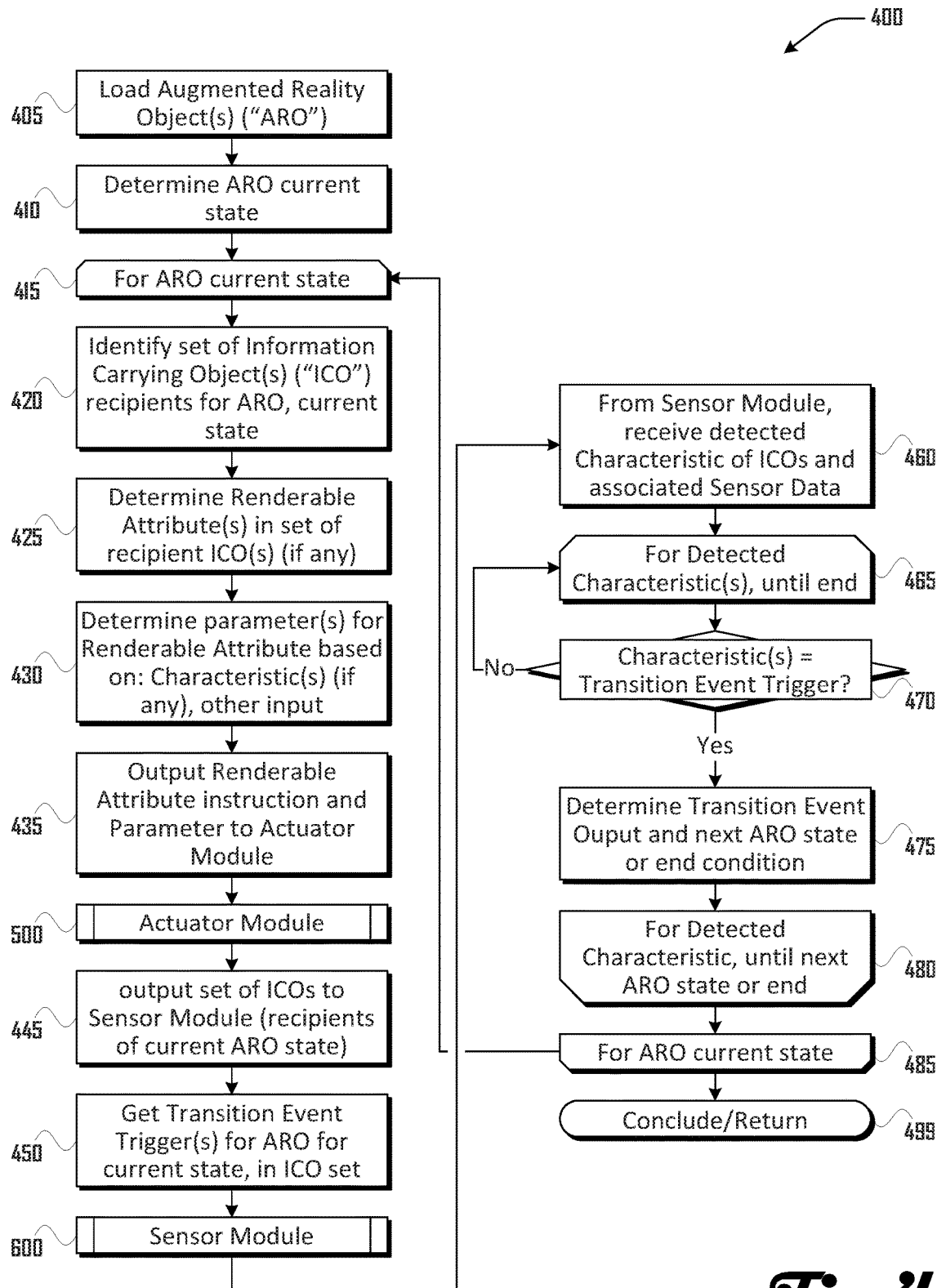
FIG. 4 is a flow diagram illustrating an example of a method which may be practiced by a Modality Tracking Module.

FIG. 4 is a flowchart illustrating an example of Modality Tracking Module 400, as may be executed by Augmented Reality Server-1 200. At block 405, Modality Tracking Module 400 may receive an instruction to initiate and may load one or more Augmented Reality Object 305 records, representing Augmented Reality Objects that Modality Tracking Module 400 is to track and/or transition from one state to another. For example, a game, video, virtual reality environment, Digital Object Rendering Module 260 or the like may specify an Augmented Reality Object representative of a person or an animal, an inanimate object, or the like.

At block 410, Modality Tracking Module 400 may determine the current state of the Augmented Reality Object 305 of block 405, such as according to an ARO State 370 record. The current state may determine, for example, whether the Augmented Reality Object 305 is embodied in a physical object in the physical environment or a digital object in a digital environment. The current state may be defined as a starting default state, may be based on a previous state, and/or may be based on an available environment, such as whether ICOs are available in the physical environment or in a digital environment, and/or may be based on user interaction with a virtual reality environment.

Opening loop block 415 to closing loop block 485 may iterate for the then-current state of Augmented Reality Object 305.

At block 420, Modality Tracking Module 400 may identify one or more (a set) of Information Carrying Objects ("ICO") which may be a recipient for or which may be used to represent Augmented Reality Object 305 in the then-current state. ICO may be represented in Augmented Server Memory 300 generally as Information Carrying Object 310 and/or as specific types of Information Carrying Object 310 records, such as Sensor-Enabled Object 315 and Digital Object 320 records. In many circumstances, there may be more than one ICO which may be a recipient for or which may be used to represent Augmented Reality Object 305 in the then-current state. In some circumstances, identification of ICO recipients may comprise selection of a subset of available ICOs. For example, if a virtual reality environment specifies an Augmented Reality Object 305 which is a weapon, if the current ARO State 370 of block 410 is in the physical environment, and if a set of ICOs are available which are foam darts of various colors in a compressed air gun, a recipient ICO may be determined to be a foam dart of a particular color.

At block 425, Modality Tracking Module 400 may identify one or more Renderable Attribute 355 records in relation to the Augmented Reality Object 305 of block 405 and of recipient ICOs of block 420. As noted, a renderable attribute may be a shape of a digital display object, a sound, a motion, a manner of interaction with other objects, and the like. The Renderable Attribute 355 may be determined based on the Augmented Reality Object 305 of block 405, its current state as determined in block 410, and the recipient ICOs of block 420. This correspondence may be provided in, for example, one or more Renderable Attribute Map 330 records. For example, using the foregoing example, if a virtual reality environment specifies an Augmented Reality Object 305 which is a weapon, if the current ARO State 370 of block 410 is in the physical environment, and if the recipient ICO of block 420 is a foam dart of a particular color, then a Renderable Attribute Map 330 record may specify that the foam dart can be fired with a variable amount of air pressure and in a variable direction.

At block 430, Modality Tracking Module 400 may determine a value of one or more parameters associated with the Renderable Attribute 355 record(s) of block 425. The parameter(s) may be, for example, the variable amount of air pressure and the variable direction. Values for these parameters may be based on a Characteristic 340 of another ICO, if any (as discussed further herein), may be based on Sensor Data 325 which may be associated with or have been recorded when a Characteristic 340 was detected, may be based on other input, such as input from a person in the local or a remote location connected to the first or to another Augmented Reality Server. Renderable attribute parameters may be recorded in Augmented Reality Server Datastore 300 as Renderable Attribute Parameter 360 records.

At block 435, Modality Tracking Module 400 may output the Renderable Attribute 355 and Renderable Attribute Parameter 360 value(s) to Actuator Module 500 for actuation or implementation by, for example, Actuator 135 (in the physical environment, as discussed in the example above, or in a digital environment, such as in Display 125).

At block 500, Modality Tracking Module 400 may execute Actuator Module 500. Actuator Module 500 is described further in relation to FIG. 5. Briefly, Actuator Module 500 implements Augmented Reality Object 305 in Information Carrying Object 310.

At block 445, Modality Tracking Module 400 may output the set of Information Carrying Object 310 records of block 420 to Sensor Detection Module 600, communicating the ICOs which embody the then-current state of the Augmented Reality Object. This allows Sensor Detection Module 600 to monitor Characteristic 340 records associated with such ICOs relative to the sensed behavior of such ICOs (sensed by Sensor Detection Module 600).

At block 450, Modality Tracking Module 400 may obtain Transition Event Trigger 345 records associated with the then-current ICOs, which records, when they obtain in data detected by a Sensor, trigger or cause a transition of the Augmented Reality Object from a then-current state to another, as may be described or recorded in ARO State 370 records.

At block 600, Modality Tracking Module 400 may execute Sensor Detection Module 600, so that Sensor Detection Module 600 will connect to Sensor(s), measure sensor data in relation to ICOs (which may be stored as Sensor Data 325), and monitor ICO sensor data for matches with Characteristic 340 records. Sensor Detection Module 600 is described further in relation to FIG. 6.

At block 460, Modality Tracking Module 400 may detect or receive matches with Characteristic 340 records and associated Sensor Data 325.

Opening loop block 465 to closing loop block 480 may iterate over Characteristic 340 and Sensor Data 325 received or identified in block 460.

At decision block 470, Modality Tracking Module 400 may determine whether the received Characteristic 340 and Sensor Data 325 received or identified in block 460 are also associated with Transition Event Trigger 345 record(s), such that they may cause a transition in the state of Augmented Reality Object 305. If affirmative, then at block 475, Modality Tracking Module 400 may determine or identify one or more Transition Event Output 350 records associated with the Transition Event Trigger 345 record(s) of block 470. Transition Event Output 350 record(s) may identify that the Augmented Reality Object 305 is to be transitioned to a subsequent Augmented Reality Object state, ARO State 370. Transition Event Output 350 record(s) may further identify aspects of the next ARO State 370, such as whether it is to be in the physical environment or a digital environment, an ICO to use in such state, or the like. This information may be contained in, for example, in one or more Renderable Attribute Map 330 record(s). At block 475, Modality Tracking Module 400 may further or alternatively determine that an end condition has occurred, such as, for example, when there is no next ARO state If negative at decision block 470, Modality Tracking Module 400 may return to opening loop block 465.

At closing loop block 485, Modality Tracking Module 400 may return to opening loop block 415 to iterate over the then-current ARO State 370 determined at block 475 or may proceed to concluding block 499. At concluding block 499, Modality Tracking Module 400 may terminate or may return to a process which may have spawned it.

Figure 5:
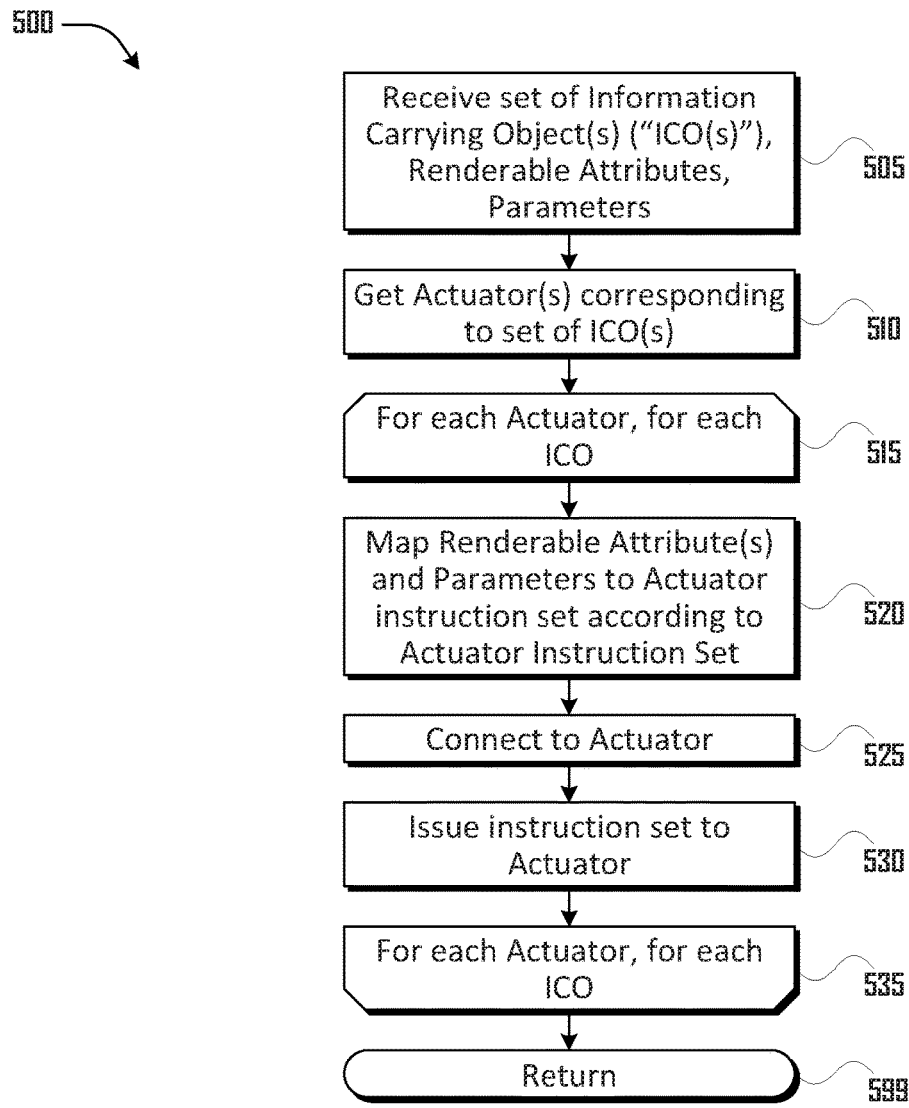
FIG. 5 is a flow diagram illustrating an example of a method which may be practiced by an Actuator Module.

FIG. 5 is a flowchart illustrating an example of Actuator Module 500, as may be executed by Augmented Reality Server-1 200. At block 505, Actuator Module 500 receive (or receive identification of) a set of Information Carrying Object 310 records, as well as Renderable Attribute 355 and Renderable Attribute Parameter 360 records. These may be received from, for example, Modality Tracking Module 400.

At block 510, Actuator Module 500 may receive and/or get Actuator 365 records corresponding to the Information Carrying Object 310 records received at block 505. Such Actuator 365 records may correspond to an Actuator, such as, for example, Actuator 135.

Opening loop block 515 to closing loop block 535 may iterate over each Actuator and each ICO of block 505.

At block 520, Actuator Module 500 may convert the Renderable Attribute 355 and Renderable Attribute Parameter 360 records to an instruction set for an Actuator, such as according to an Actuator Instruction Set 375 record. The instruction set for an Actuator may describe how an Actuator is to be operated, for example, to implement Renderable Attribute 355 and Renderable Attribute Parameter 360 records.

At block 525, Actuator Module 500 may connect to the Actuator of block 510 which is then being iterated over and, at block 530, may issue the instruction set determined at block 520 to the Actuator.

At concluding block 599, Actuator Module 500 may terminate and/or return to a process which spawned it.

Figure 6:
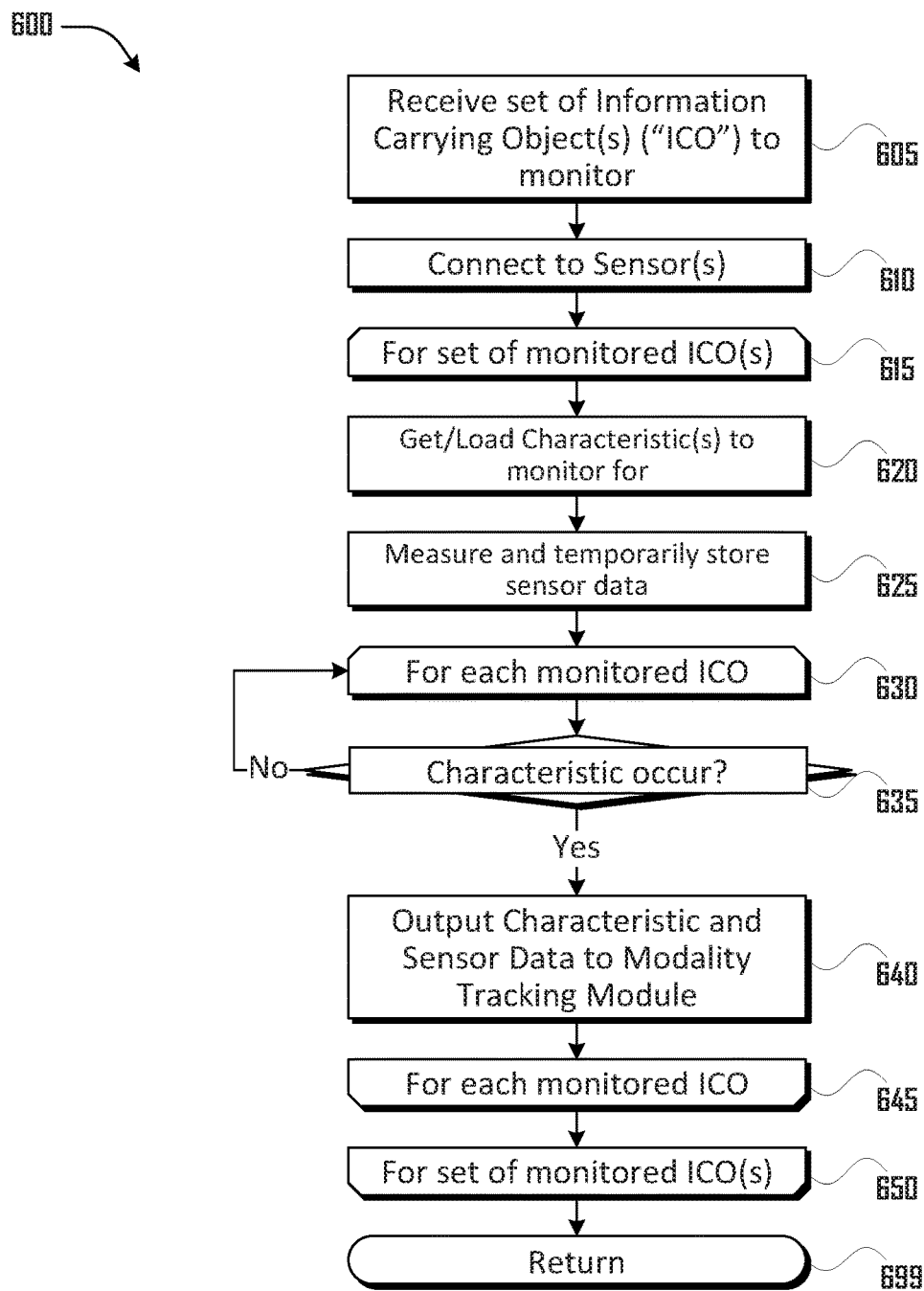
FIG. 6 is a flow diagram illustrating an example of a method which may be practiced by a Sensor Module.

FIG. 6 is a flowchart illustrating an example of Sensor Detection Module 600, as may be executed by Augmented Reality Server-1 200. At block 605, Sensor Detection Module 600 may receive a set of Information Carrying Object 310 records to monitor. At block 610, Sensor Detection Module 600 may determine and may connect to Sensor(s) associated with the Information Carrying Object 310 records of block 605.

Opening loop block 615 to closing loop block 615 may iterate over the set of Information Carrying Object 310 records of block 605. At block 620, Sensor Detection Module 600 obtain and load Characteristic 340 records which describe characteristics of ICOs which Sensor Detection Module 600 is to monitor for.

At block 625, Sensor Detection Module 600 may measure and temporarily store sensor data obtained by the Sensor(s) of block 610.

Opening loop block 630 to closing loop block 645 may iterate over each ICO in the set of ICOs of block 605.

At decision block 635, Sensor Detection Module 600 may determine if sensor data of block 625 matches Characteristic 340 record of block 620. If affirmative, then at block 640, Sensor Detection Module 600 may output the matched Characteristic 340 record; Sensor Detection Module 600 may store the temporarily stored sensor data as Sensor Data 325, and Sensor Detection Module 600 may output the Characteristic 340 and Sensor Data 325 to Modality Tracking Module 400.

Sensor Detection Module 600 may return to block 630 to iterate over each monitored ICO and to block 615 to iterate over the set of ICOs.

At concluding block 699, Sensor Detection Module 600 may conclude or may return to a process which may have spawned it, such as Modality Tracking Module 400.

Figure 7:
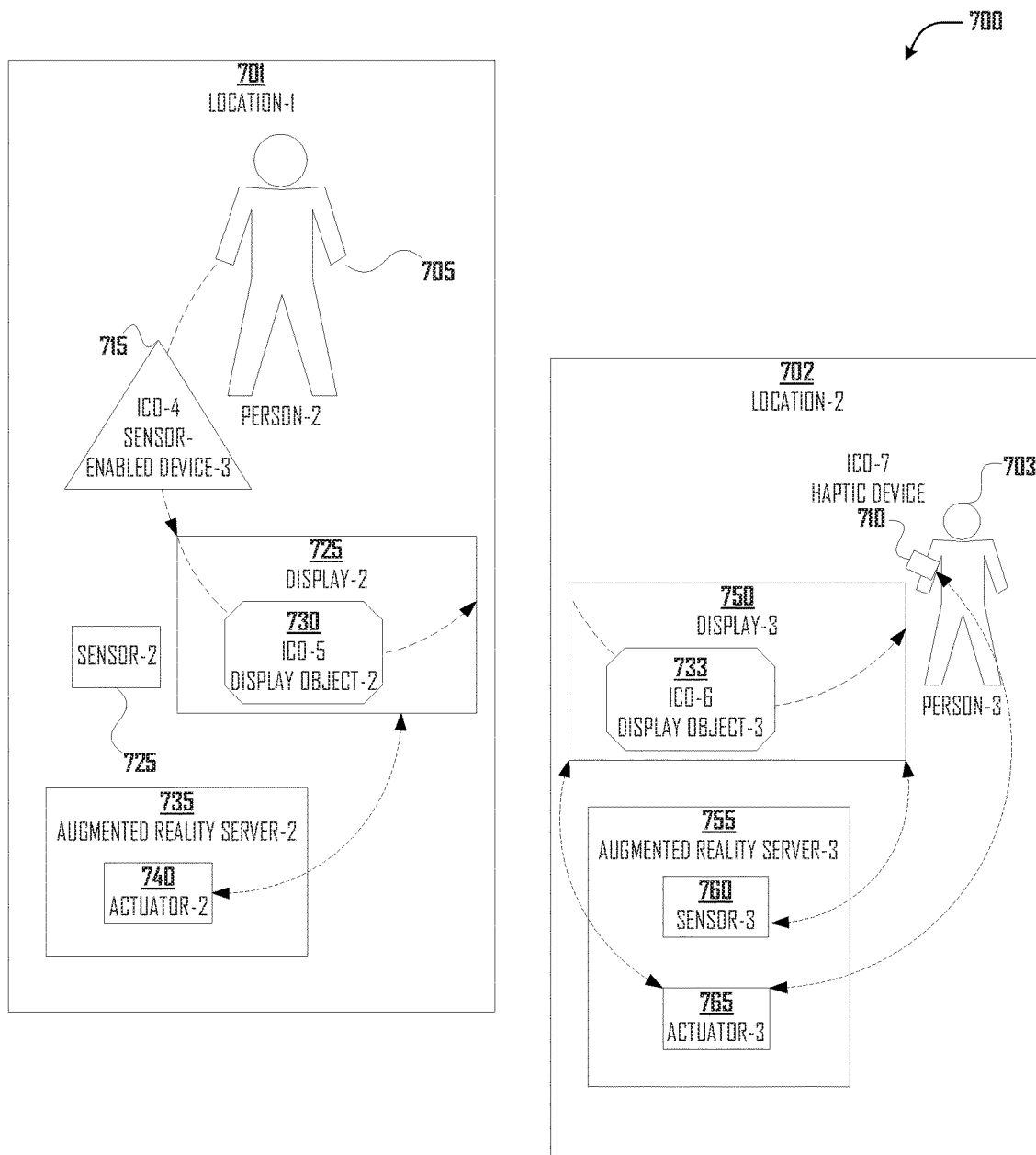
FIG. 7 is a functional block diagram illustrating an example of an Augmented Reality Object being transitioned between environments and in more than one location.

FIG. 7 is a functional block diagram illustrating an example of an Augmented Reality Object being transitioned between environments and in more than one location.

Illustrated in FIG. 7 are Location-1 701, Location-2 702, Augmented Reality Server-2 735, Augmented Reality Server-3 755, Person-2 705 and Person-3 703. Location-1 701 and Location-2 702 may be physically separated locations; Person-2 705 and Person-3 703 may be interacting with one another, with other people not illustrated, or they may be acting by themselves in a virtual reality environment.

In Location-1 701, Person-2 705 may be participating in a virtual reality environment executed by, for example, Augmented Reality Server-2 735 and a Digital Object Rendering Module 260 or the like. The virtual reality environment may comprise Augmented Reality Objects which can transition between the physical and digital environments. Augmented Reality Server-2 735 may be executing Modality Tracking Module 400 or the like.

ICO-4 Sensor-Enabled Device-2 715 may comprise a wolf-shaped bean-bag or a ball with a wolf picture or the like. ICO-4 Sensor-Enabled Device-2 715 may further comprise an embedded RFID or the like which can communicate with Sensor-2 725. Person-2 705 may throw, roll, or propel ICO-4 Sensor-Enabled Device-2 715 toward Display 725. Augmented Reality Server-2 735 and Modality Tracking Module 400 may execute Sensor Detection Module 600 or the like, which may connect with Sensor-2 725. Sensor-2 725 may detect the approach of ICO-4 Sensor-Enabled Device-2 715 toward Display 725. ICO-4 Sensor-Enabled Device-2 715 may be instantiated by Modality Tracking Module 400 as a recipient for an Augmented Reality Object in the virtual reality environment. There may be no Renderable Attributes for Modality Tracking Module 400 to implement with Actuator Module 500.

Modality Tracking Module 400 and Sensor-2 725 may detect the approach of ICO-4 Sensor-Enabled Device-2 715 toward Display 725 as a Characteristic 340, which Characteristic 340 may also be associated with a Transition Event Trigger 345 for the Augmented Reality Object. Modality Tracking Module 400 may advance the state of the Augmented Reality Object according to a next ARO State 370 record. The next ARO State 370 record may define that the Augmented Reality Object is to transition into a digital object, such as ICO-5 Display Object-2 730. Actuator-2 740 may be used to instruct Display-2 725 and/or the Digital Object Rendering Module 260 to have ICO-5 Display Object-2 730 "run" across Display-2 725 with a speed and in a direction derived from Characteristic 340 or Sensor Data 325.

In addition to or alternative to being rendered on Display-2 725, ICO-5 Display Object-2 730 may also be rendered on Display-3 750 in Location-2 702, proximate to Person-3 703, according to instructions issued by Actuator-3 765, as ICO-6 Display Object-3 733. Continuing this example, Sensor-3 760 and an instance of Modality Tracking Module 400 executed by Augmented Reality Server-3 755, acting via an instance of Sensor Detection Module 600 also as executed by Augmented Reality Server-3 755, may detect that ICO-6 Display Object-3 733 contacts the boarder of a window in Display-3, which contact may be a Transition Event Trigger 345 for transitioning Augmented Reality Object from ICO-6 Display Object-3 733 to a next ARO State 370 record. Person-3 703 may be holding Display-3 750 with a haptic device on the arm proximate to Display-3 750. Renderable Attribute Map 330 may define that the next ARO State 370 associated with the Augmented Reality Object will be haptic output to ICO-7 Haptic Device 710, which output may be activated by Actuator-3 765 and an instance of Actuator Module 700 executed by Augmented Reality Server-3 755.

Figure 8:
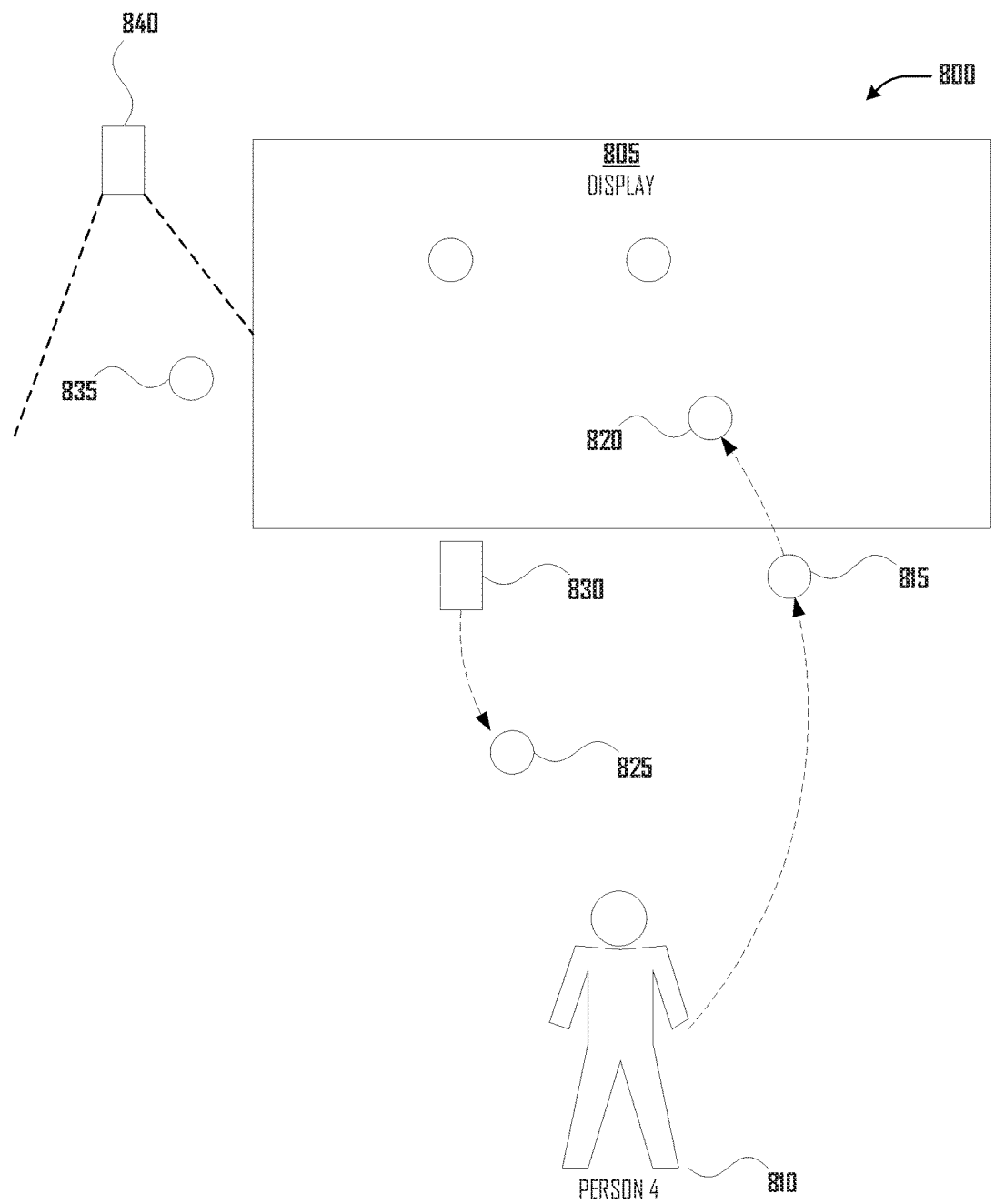
FIG. 8 is a functional block diagram illustrating an example of several Augmented Reality Objects being transitioned between environments.

FIG. 8 is a functional block diagram illustrating an example of several Augmented Reality Objects being transitioned between environments. In this example, Display 805 may be displaying several balls. Display 805 is acting as a Digital Object Rendering Module and as an Augmented Reality Server.

In this example, Person-4 810 has thrown a Ball 815 toward Display 805. Ball 815 is an Information Carrying Object and has been determined to be an Augmented Reality Object. A sensor (not illustrated) has detected the movement of Ball 815, an object identifier of Ball 815 has been detected; Augmented Reality Server has determined that Ball is an Information Carrying Object and an Augmented Reality Object and has measured a Characteristic of Ball 815, such as that it is moving toward Display 805. A modality tracking module within (or associated with) Display 805 has determined that this is a transition event trigger, associated with a transition event output, which, via an Actuator Module in Display 805, causes Display 805 to render Ball 820 as a digital object in Display 805 with a characteristic derived from the characteristic of Ball 815, such that Ball 820 appears to move as fast as Ball 815 and continuing the same direction of travel.

Ball 820 or another of the balls rendered in Display 805 may "bounce" off of an object (not illustrated) back toward Person-4 810. In this case, modality tracking module determines that a characteristic of Ball 820 (movement through a 3 dimensional space toward the edge of the screen and toward Person-4 810) is a transition event trigger, associated with a transition event output, which, via Actuator Module in Display 805, causes Actuator 830 to shoot a real Ball 825 toward Person-4 810.

Also illustrated in FIG. 8, Projector 840 also acts as an Actuator, which may render Ball 835 on a wall or the like in the environment, which may depict one of the balls rendered in Display 805 "rolling" off the screen.

Figure 9A:
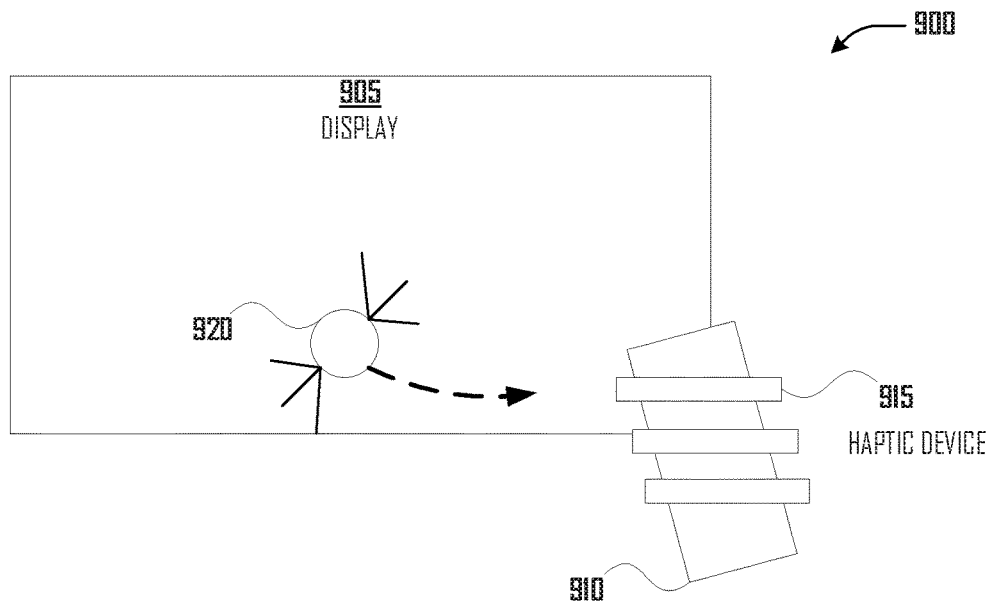
FIG. 9A is a functional block diagram illustrating an example of an Augmented Reality Object in an environment.

FIG. 9A is a functional block diagram illustrating an example of an Augmented Reality Object, in this example digitally rendered Spider 920, in an environment rendered by Display 905. Display 905 may be acting as or be controlled by an Augmented Reality Server with a Modality Tracking Module. Spider 920 may be a Digital Object, with an Object Identifier, which identifies it as an Information Carrying Object rendered by a Digital Object Rendering Module within Display 905, which Information Carrying Object is also an Augmented Reality Object. Movement of Spider 920 may be detected in sensor data by a Sensor Detection Module within Display 905 and a Characteristic of Spider 920 may be measured, such as its apparent speed.

Figure 9B:
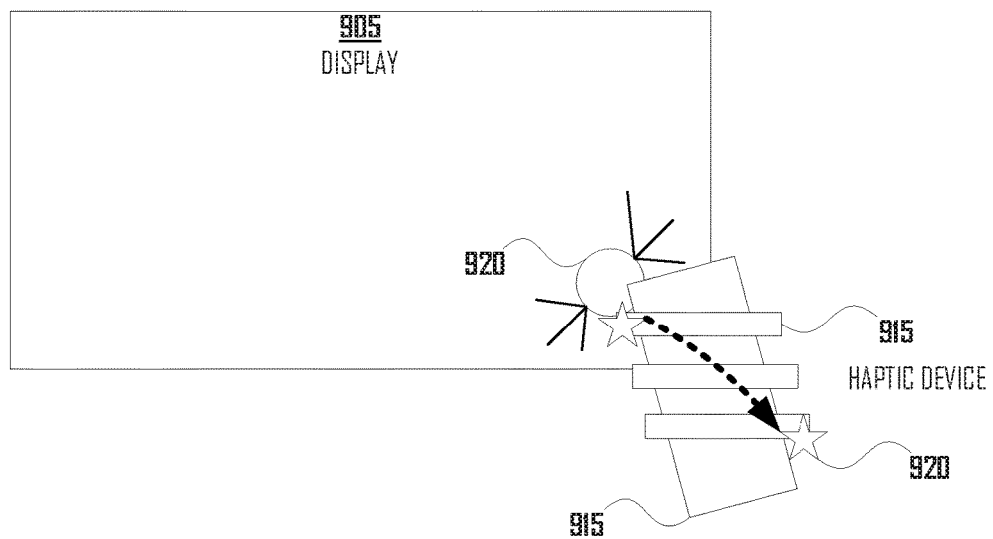
FIG. 9B is a functional block diagram of the Augmented Reality Object of FIG. 9A, transitioning to another environment.

In FIGS. 9A and 9B, Hand 910 may be holding Display 905. Hand 910 and/or an arm connected to Hand 910 may have wrapped around it Haptic Device 915.

FIG. 9B, Spider 920 has approached the side of Display 905 proximate to Hand 910, which may be detected by Sensor Detection Module within Display 905 as a transition event trigger associated with a transition event output. A measured Characteristic of Spider 920, such as it's apparent speed, may be transitioned, via an Actuator Module within Display 905, to Haptic Device 915, as a Renderable Parameter of a Renderable Attribute, in this case a propagating vibration 920, which may propagate with a speed derived from the speed of Spider 920.

These configurations are illustrative, other configurations may also be practiced.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for transitioning an augmented reality object between physical and digital environments, comprising: a computer processor and memory, which memory comprises a sensor detection module, a modality tracking module, and an actuator module, which modules are to be operated by the computer processor; wherein the sensor detection module is to detect an object identifier of a first information carrying object and a characteristic of the first information carrying object in a sensor data received from a sensor; wherein the modality tracking module is to determine, based on the object identifier and the characteristic, a transition event trigger associated with the first information carrying object and a transition event output associated with a second information carrying object; wherein the actuator module is to activate, via an actuator, a renderable attribute in the second information carrying object; and wherein the first information carrying object is one of a sensor-enabled physical object or a digital object rendered in a digital environment and the second information carrying object is the other.

Example 2 may include the apparatus according to Example 1, wherein the modality tracking module is to further determine a renderable parameter of the renderable attribute according to the characteristic.

Example 3 may include the apparatus according to Example 2, wherein the renderable attribute in the second information carrying object approximates the characteristic of the first information carrying object according to the renderable parameter, determined by the modality tracking at least in part according to a renderable attribute map.

Example 4 may include the apparatus according to Example 1, wherein the sensor-enabled physical object comprises a physical object comprising an emitter or detector of at least one of an acoustic energy, an electromagnetic radiation, an electric energy, an acceleration, and a magnetic field.

Example 5 may include the apparatus according to any one of Example 1 to Example 4, wherein the characteristic of the first information carrying object comprises at least one of a physical characteristic of the sensor-enabled physical object and a rendered digital characteristic of the digital object.

Example 6 may include the apparatus according to any one of Example 1 to Example 4, wherein the characteristic comprises at least one of a time, an orientation, a position, a rate of change in position, a relative position, an encoded information, a color, and a sound.

Example 7 may include the apparatus according to any one of Example 1 to Example 4, wherein: the sensor is a sensor of the sensor-enabled physical object and a sensor of the digital object; the actuator is an actuator of the sensor-enabled physical object and an actuator of the digital object; wherein the sensor of the sensor-enabled physical object comprises at least one of a microphone, a motion detector, a camera, a capacitive surface, an electromagnetic detector, a vibration detector, a proximity detector, and a fiducial marker detector, wherein the sensor of the digital object and the actuator of the digital object comprise a registration by the sensor module with a digital object rendering module; and wherein the actuator comprises at least one of a speaker, a haptic output device, a motor, a projectile, and a digital rendering module.

Example 8 may include the apparatus according to Example 3, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; wherein the sensor module is to detect a second object identifier of the second information carrying object and a second characteristic of the second information carrying object in a second sensor data received from the sensor; wherein the modality tracking module is to determine, based on the second object identifier and the second characteristic, a second transition event trigger associated with the second information carrying object and a second transition event output associated with a third information carrying object, which third information carrying object comprises at least one of a second sensor-enabled physical object and a second digital object; and wherein the actuator module is to activate a second renderable attribute in the third information carrying object, which second renderable attribute comprises a second renderable parameter determined by the modality tracking module according to the second characteristic, wherein the second renderable attribute in the third information carrying object approximates the second characteristic of the second information carrying object, determined by the modality tracking module at least in part according to the renderable attribute map.

Example 9 may include a method for computing comprising: in a computing device comprising a processor, a memory, a sensor, a digital rendering environment, and an actuator; transitioning an augmented reality object from a first information carrying object to a second information carrying object by: with the sensor, detecting an object identifier of the first information carrying object and a characteristic of the first information carrying object in a sensor data received from the sensor; based on the object identifier and the characteristic, determining a transition event trigger associated with the first information carrying object and a transition event output associated with the second information carrying object; with the actuator, activating a renderable attribute in the second information carrying object; wherein the first information carrying object is one of a sensor-enabled physical object or a digital object rendered in the digital environment and the second information carrying object is the other.

Example 10 may include the method according to Example 9, further comprising determining a renderable parameter of the renderable attribute according to the characteristic.

Example 11 may include the method according to Example 10, further comprising determining the renderable parameter at least in part according to a renderable attribute map, wherein the renderable attribute in the second information carrying object approximates the characteristic of the first information carrying object according to the renderable parameter at least in part according to the renderable attribute map.

Example 12 may include the method according to Example 9, wherein the sensor-enabled physical object comprises a physical object comprising an emitter or detector of at least one of an acoustic energy, an electromagnetic radiation, an electric energy, an acceleration, and a magnetic field.

Example 13 may include the method according to any one of Example 9 to Example 12, wherein the characteristic of the first information carrying object comprises at least one of a physical characteristic of the sensor-enabled physical object and a rendered digital characteristic of the digital object.

Example 14 may include the method according to any one of Example 9 to Example 12, wherein the characteristic comprises at least one of a time, an orientation, a position, a rate of change in position, a color, and a sound.

Example 15 may include the method according to any one of Example 9 to Example 12, wherein: the sensor is a sensor of the sensor-enabled physical object and a sensor of the digital object; the actuator is an actuator of the sensor-enabled physical object and an actuator of the digital object; wherein the sensor of the sensor-enabled physical object comprises at least one of a microphone, a motion detector, a camera, a capacitive surface, an electromagnetic detector, a vibration detector, a proximity detector, and a fiducial marker detector, wherein the method further comprises the sensor of the digital object and the actuator of the digital object registering to receive a digital object behavior data regarding and sending a digital object behavior data to the digital object in the digital rendering environment; and wherein the actuator comprises at least one of a speaker, a haptic output device, a motor, a projectile, and the digital object in the digital display.

Example 16 may include the method according to Example 11, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; and the method further comprising: detecting a second object identifier of the second information carrying object and a second characteristic of the second information carrying object in a second sensor data received from the sensor; determining, based on the second object identifier and the second characteristic, a second transition event trigger associated with the second information carrying object and a second transition event output associated with a third information carrying object, which third information carrying object comprises at least one of a second sensor-enabled physical object and a second digital object; determining a second renderable parameter of the second renderable attribute according to the second characteristic of the second information carrying object and the renderable attribute map; and activating the second renderable attribute in the third information carrying object, wherein the second renderable attribute in the third information carrying object approximates the second characteristic of the second information carrying object according to the second renderable parameter.

Example 17 may include an apparatus for transitioning an augmented reality object between physical and digital environments, comprising: in a computing device comprising a processor, a memory, a sensor, and an actuator; means for, with the sensor, detecting an object identifier of the first information carrying object and a characteristic of the first information carrying object; means for, based on the object identifier and the characteristic, determining a transition event trigger associated with the first information carrying object and a transition event output associated with a second information carrying object; means for activating, via the actuator, a renderable attribute in the second information carrying object; and wherein the first information carrying object is one of a sensor-enabled physical object or a digital object and the second information carrying object is the other.

Example 18 may include the apparatus according to Example 17, further comprising means for determining a renderable parameter of the renderable attribute according to the characteristic.

Example 19 may include the apparatus according to Example 18, further comprising means for determining the renderable parameter at least in part according to a renderable attribute map, wherein the renderable attribute in the second information carrying object approximates the characteristic of the first information carrying object according to the renderable parameter at least in part according to the renderable attribute map.

Example 20 may include the apparatus according to Example 17, wherein the sensor-enabled physical object comprises a physical object comprising an emitter or detector of at least one of an acoustic energy, an electromagnetic radiation, an electric energy, an acceleration, and a magnetic field.

Example 21 may include the apparatus according to any one of Example 17 to Example 20, wherein the characteristic of the first information carrying object comprises at least one of a physical characteristic of the sensor-enabled physical object and a rendered digital characteristic of the digital object.

Example 22 may include the apparatus according to any one of Example 17 to Example 20, wherein the characteristic comprises at least one of a time, an orientation, a position, a rate of change in position, a color, and a sound.

Example 23 may include the apparatus according to any one of Example 17 to Example 20, wherein: the sensor is a sensor of the sensor-enabled physical object and a sensor of the digital object; the actuator is an actuator of the sensor-enabled physical object and an actuator of the digital object; wherein the sensor of the sensor-enabled physical object comprises at least one of a microphone, a motion detector, a camera, a capacitive surface, an electromagnetic detector, a vibration detector, a proximity detector, and a fiducial marker detector, wherein the sensor of the digital object and the actuator of the digital object comprises means for registering to receive a digital object behavior data regarding and means for sending a digital object behavior data to the digital object in a digital rendering environment of the apparatus; and wherein the actuator comprises at least one of a speaker, a haptic output device, a motor, a projectile, and the digital object in the digital display.

Example 24 may include the apparatus according to Example 19, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; and the apparatus further comprises: means for detecting a second object identifier of the second information carrying object and a second characteristic of the second information carrying object in a second sensor data received from the sensor; means for determining, based on the second object identifier and the second characteristic, a second transition event trigger associated with the second information carrying object and a second transition event output associated with a third information carrying object, which third information carrying object comprises at least one of a second sensor-enabled physical object and a second digital object; means for determining a second renderable parameter of the second renderable attribute according to the second characteristic of the second information carrying object and the renderable attribute map; and means for activating the second renderable attribute in the third information carrying object, wherein the second renderable attribute in the third information carrying object approximates the second characteristic of the second information carrying object according to the second renderable parameter.

Example 25 may include one or more computer-readable media comprising instructions that cause a computing device, in response to execution of the instructions by one or more processors of the computing device, to: transition an augmented reality object from a first information carrying object to a second information carrying object by: with a sensor, detect an object identifier of the first information carrying object and a characteristic of the first information carrying object in a sensor data received from the sensor; based on the object identifier and the characteristic, determining a transition event trigger associated with the first information carrying object and a transition event output associated with the second information carrying object; with an actuator, activating a renderable attribute in the second information carrying object; and wherein the first information carrying object is one of a sensor-enabled physical object or a digital object rendered in a digital environment and the second information carrying object is the other.

Example 26 may include the computer-readable media according to Example 25, wherein the computing device is further caused to determine a renderable parameter of the renderable attribute according to the characteristic.

Example 27 may include the computer-readable media according to Example 26, the computing device is further caused to determine the renderable parameter at least in part according to a renderable attribute map, wherein the renderable attribute in the second information carrying object approximates the characteristic of the first information carrying object according to the renderable parameter at least in part according to the renderable attribute map.

Example 28 may include the computer-readable media according to Example 25, wherein the sensor-enabled physical object comprises a physical object comprising an emitter or detector of at least one of an acoustic energy, an electromagnetic radiation, an electric energy, an acceleration, and a magnetic field.

Example 29 may include the computer-readable media according to any one of Example 25 to Example 28, wherein the characteristic of the first information carrying object comprises at least one of a physical characteristic of the sensor-enabled physical object and a rendered digital characteristic of the digital object.

Example 30 may include the computer-readable media according to any one of Example 25 to Example 28, wherein the characteristic comprises at least one of a time, an orientation, a position, a rate of change in position, a color, and a sound.

Example 31 may include the computer-readable media according to any one of Example 25 to Example 28, wherein: the sensor is a sensor of the sensor-enabled physical object and a sensor of the digital object; the actuator is an actuator of the sensor-enabled physical object and an actuator of the digital object; wherein the sensor of the sensor-enabled physical object comprises at least one of a microphone, a motion detector, a camera, a capacitive surface, an electromagnetic detector, a vibration detector, a proximity detector, and a fiducial marker detector, wherein the sensor of the digital object and the actuator of the digital object comprises a registration to receive a digital object behavior data regarding and to send a digital object behavior data to the digital object in a digital rendering environment of the computing device; and wherein the actuator comprises at least one of a speaker, a haptic output device, a motor, a projectile, and the digital object in the digital display.

Example 32 may include the computer-readable media according to Example 27, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; and the computing device is further caused to: detect a second object identifier of the second information carrying object and a second characteristic of the second information carrying object in a second sensor data received from the sensor; determine, based on the second object identifier and the second characteristic, a second transition event trigger associated with the second information carrying object and a second transition event output associated with a third information carrying object, which third information carrying object comprises at least one of a second sensor-enabled physical object and a second digital object; determine a second renderable parameter of the second renderable attribute according to the second characteristic of the second information carrying object and the renderable attribute map; and activate the second renderable attribute in the third information carrying object, wherein the second renderable attribute in the third information carrying object approximates the second characteristic of the second information carrying object according to the second renderable parameter.

Other embodiments may use different sequencing, additional or fewer operations, and different nomenclature or terminology to accomplish similar functions. In some embodiments, various operations or set of operations may be performed in parallel with other operations, either in a synchronous or asynchronous manner. The operations selected here were chosen to illustrate some principals of operations in a simplified form. It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. An apparatus for transitioning an augmented reality object between physical and digital environments, comprising:
a computer processor and memory, wherein the memory comprises a sensor detection module, a modality tracking module, and an actuator module, wherein the modules are to be operated by the computer processor;
wherein the sensor detection module is to detect an object identifier of a first information carrying object and a characteristic of the first information carrying object in a sensor data received from a sensor;
wherein the modality tracking module is to determine, based on the object identifier and the characteristic, a transition event trigger associated with the first information carrying object and a transition event output associated with a second information carrying object;
wherein the actuator module is to activate, via an actuator, a renderable attribute in the second information carrying object; and
wherein the first information carrying object is a first of two types of objects and the second information carrying object is a second of the two types of objects, and wherein the two types of object are a sensor-enabled physical object and a digital object rendered in the digital environment.

2. The apparatus according to claim 1, wherein the modality tracking module is to further determine a renderable parameter of the renderable attribute according to the characteristic.

3. The apparatus according to claim 2, wherein the renderable attribute in the second information carrying object approximates the characteristic of the first information carrying object according to the renderable parameter, determined by the modality tracking module at least in part according to a renderable attribute map.

4. The apparatus according to claim 3, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data;
wherein the sensor detection module is to detect a second object identifier of the second information carrying object and a second characteristic of the second information carrying object in a second sensor data received from the sensor;
wherein the modality tracking module is to determine, based on the second object identifier and the second characteristic, a second transition event trigger associated with the second information carrying object and a second transition event output associated with a third information carrying object, which third information carrying object comprises at least one of a second sensor-enabled physical object and a second digital object; and
wherein the actuator module is to activate a second renderable attribute in the third information carrying object, which second renderable attribute comprises a second renderable parameter determined by the modality tracking module according to the second characteristic, wherein the second renderable attribute in the third information carrying object approximates the second characteristic of the second information carrying object, determined by the modality tracking module at least in part according to the renderable attribute map.

5. The apparatus according to claim 1, wherein the sensor-enabled physical object comprises a physical object comprising an emitter or detector of at least one of an acoustic energy, an electromagnetic radiation, an electric energy, an acceleration, and a magnetic field.

6. The apparatus according to claim 1, wherein the characteristic of the first information carrying object comprises at least one of a physical characteristic of the sensor-enabled physical object and a rendered digital characteristic of the digital object.

7. The apparatus according to claim 1, wherein the characteristic comprises at least one of a time, an orientation, a position, a rate of change in position, a relative position, an encoded information, a color, and a sound.

8. The apparatus according to claim 1, wherein:
the sensor is a sensor of the sensor-enabled physical object and a sensor of the digital object;
the actuator is an actuator of the sensor-enabled physical object and an actuator of the digital object;
wherein the sensor of the sensor-enabled physical object comprises at least one of a microphone, a motion detector, a camera, a capacitive surface, an electromagnetic detector, a vibration detector, a proximity detector, and a fiducial marker detector, wherein the sensor of the digital object comprises a registration by the sensor detection module with a digital object rendering module to receive information regarding rendering of the digital object by the digital object rendering module; and wherein the actuator of the sensor-enabled physical object comprises at least one of a speaker, a haptic output device, a motor, a projectile, and wherein the actuator of the digital object comprises a registration by the actuator of the digital object with the digital object rendering module to control rendering of the digital object by the digital object rendering module.

9. A method for transitioning an augmented reality object between physical and digital environments, comprising:

in a computing device comprising a processor, a memory, a sensor, a digital rendering environment, and an actuator;

transitioning an augmented reality object from a first information carrying object to a second information carrying object by:

with the sensor, detecting an object identifier of the first information carrying object and a characteristic of the first information carrying object in a sensor data received from the sensor;

based on the object identifier and the characteristic, determining a transition event trigger associated with the first information carrying object and a transition event output associated with the second information carrying object;

with the actuator, activating a renderable attribute in the second information carrying object;

wherein the first information carrying object is a first of two types of objects and the second information carrying object is a second of the two types of objects, and wherein the two types of object are a sensor-enabled physical object and a digital object rendered in the digital environment.

10. The method according to claim 9, further comprising determining a renderable parameter of the renderable attribute according to the characteristic.

11. The method according to claim 10, further comprising determining the renderable parameter at least in part according to a renderable attribute map, wherein the renderable attribute in the second information carrying object approximates the characteristic of the first information carrying object according to the renderable parameter at least in part according to the renderable attribute map.

12. The method according to claim 11, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; and the method further comprising:

detecting a second object identifier of the second information carrying object and a second characteristic of the second information carrying object in a second sensor data received from the sensor;

determining, based on the second object identifier and the second characteristic, a second transition event trigger associated with the second information carrying object and a second transition event output associated with a third information carrying object, which third information carrying object comprises at least one of a second sensor-enabled physical object and a second digital object;

determining a second renderable parameter of a second renderable attribute according to the second characteristic of the second information carrying object and the renderable attribute map; and activating the second renderable attribute in the third information carrying object, wherein the second renderable attribute in the third information carrying object approximates the second characteristic of the second information carrying object according to the second renderable parameter.

13. The method according to claim 9, wherein the sensor-enabled physical object comprises a physical object comprising an emitter or detector of at least one of an acoustic energy, an electromagnetic radiation, an electric energy, an acceleration, and a magnetic field.

14. The method according to claim 9, wherein the characteristic of the first information carrying object comprises at least one of a physical characteristic of the sensor-enabled physical object and a rendered digital characteristic of the digital object.

15. The method according to claim 9, wherein the characteristic comprises at least one of a time, an orientation, a position, a rate of change in position, a color, and a sound.

16. The method according to claim 9, wherein:

the sensor is a sensor of the sensor-enabled physical object and a sensor of the digital object;

the actuator is an actuator of the sensor-enabled physical object and an actuator of the digital object;

wherein the sensor of the sensor-enabled physical object comprises at least one of a microphone, a motion detector, a camera, a capacitive surface, an electromagnetic detector, a vibration detector, a proximity detector, and a fiducial marker detector, wherein the method further comprises the sensor of the digital object and the actuator of the digital object registering to receive a digital object behavior data regarding and sending a digital object behavior data to the digital object in the digital rendering environment; and wherein the actuator comprises at least one of a speaker, a haptic output device, a motor, a projectile, and the digital object in a digital display.

17. One or more non-transitory computer-readable media comprising instructions that cause a computing device, in response to execution of the instructions by one or more processors of the computing device, to:

transition an augmented reality object from a first information carrying object to a second information carrying object by:

with a sensor, detect an object identifier of the first information carrying object and a characteristic of the first information carrying object in a sensor data received from the sensor;

based on the object identifier and the characteristic, determining a transition event trigger associated with the first information carrying object and a transition event output associated with the second information carrying object;

with an actuator, activating a renderable attribute in the second information carrying object; and wherein the first information carrying object is a first of two types of objects and the second information carrying object is a second of the two types of objects, and wherein the two types of objects are a sensor-enabled physical object and a digital object rendered in a digital environment.

18. The non-transitory computer-readable media according to claim 17, wherein the computing device is further caused to determine a renderable parameter of the renderable attribute according to the characteristic.

19. The non-transitory computer-readable media according to claim 18, wherein the computing device is further caused to determine the renderable parameter at least in part according to a renderable attribute map, wherein the renderable attribute in the second information carrying object approximates the characteristic of the first information carrying object according to the renderable parameter at least in part according to the renderable attribute map.

20. The non-transitory computer-readable media according to claim 19, wherein the object identifier is a first object identifier, the characteristic is a first characteristic, the transition event trigger is a first transition event trigger, the transition event output is a first transition event output, the sensor-enabled physical object is a first sensor-enabled physical object, the digital object is a first digital object, the renderable attribute is a first renderable attribute, the renderable parameter is a first renderable parameter, and the sensor data is a first sensor data; and the computing device is further caused to:

detect a second object identifier of the second information carrying object and a second characteristic of the second information carrying object in a second sensor data received from the sensor;

determine, based on the second object identifier and the second characteristic, a second transition event trigger associated with the second information carrying object and a second transition event output associated with a third information carrying object, which third information carrying object comprises at least one of a second sensor-enabled physical object and a second digital object;

determine a second renderable parameter of a second renderable attribute according to the second characteristic of the second information carrying object and the renderable attribute map; and activate the second renderable attribute in the third information carrying object, wherein the second renderable attribute in the third information carrying object approximates the second characteristic of the second information carrying object according to the second renderable parameter.

21. The non-transitory computer-readable media according to claim 17, wherein the sensor-enabled physical object comprises a physical object comprising an emitter or detector of at least one of an acoustic energy, an electromagnetic radiation, an electric energy, an acceleration, and a magnetic field.

22. The non-transitory computer-readable media according to claim 17, wherein the characteristic of the first information carrying object comprises at least one of a physical characteristic of the sensor-enabled physical object and a rendered digital characteristic of the digital object.

23. The non-transitory computer-readable media according to claim 17, wherein the characteristic comprises at least one of a time, an orientation, a position, a rate of change in position, a color, and a sound.

24. The non-transitory computer-readable media according to claim 17, wherein:

the sensor is a sensor of the sensor-enabled physical object and a sensor of the digital object;

the actuator is an actuator of the sensor-enabled physical object and an actuator of the digital object;

wherein the sensor of the sensor-enabled physical object comprises at least one of a microphone, a motion detector, a camera, a capacitive surface, an electromagnetic detector, a vibration detector, a proximity detector, and a fiducial marker detector, wherein the sensor of the digital object and the actuator of the digital object comprises a registration to receive a digital object behavior data regarding and to send a digital object behavior data to the digital object in a digital rendering environment of the computing device; and wherein the actuator comprises at least one of a speaker, a haptic output device, a motor, a projectile, and the digital object in a digital display.

* * * * *